United States Patent
Rambacher et al.

[15] 3,679,694
[45] July 25, 1972

[54] L- AND DL-2-GUANIDINO-1,3-THIAZOLINE CARBOXYLIC ACID-4 AND METHOD OF MAKING SAME

[72] Inventors: Paul Rambacher, 82 Rosenheim, Steffinerstrasse 4, Siegfried Mäke, 8201 Kirchdorf am Inn, both of Germany

[22] Filed: June 10, 1969

[21] Appl. No.: 832,003

[30] Foreign Application Priority Data

July 30, 1968 Germany......................P 17 95 021.9

[52] U.S. Cl............................260/299, 260/242, 260/306.7, 260/482, 260/499, 260/525
[51] Int. Cl. ........................................C07d 91/24
[58] Field of Search..............................260/299, 306.7, 242

[56] References Cited
UNITED STATES PATENTS 3,177,222  4/1965  Surrey ................................260/306.7
3,256,291  6/1966  Trofimenko..........................260/299

*Primary Examiner*—Alex Mazel
*Assistant Examiner*—R. J. Gallagher
*Attorney*—Alexander R. Herzfeld

[57] ABSTRACT

The application discloses L- and DL-2-guanidino-1,3-thiazoline carboxylic acid-4 and its tautomere, L- and DL-2-guanidino-1,3-thiazolidine carboxylic acid-4, as well as their basic copper salts, and a method of making these novel and useful compositions by reacting cysteine hydrochloride and dicyandiamide. In addition, advantageous uses of these compositions are disclosed, notably, for instance, as precipitating agents for inorganic or organic acids, and as means for separating the optical antipodes of the racemates of optically active acids.

4 Claims, No Drawings

L- AND DL-2-GUANIDINO-1,3-THIAZOLINE CARBOXYLIC ACID-4 AND METHOD OF MAKING SAME

FIELD OF THE INVENTION

The present invention relates to thiazoline- and thiazolidine carboxylic acids and more particularly is concerned with the new and useful compositions of L- and DL-2-guanidino-1,3-thiazoline carboxylic acid-4 and its tautomere and the basic copper salt of these compositions, as well as a method of making them and useful and advantageous uses of the same.

BACKGROUND OF THE INVENTION

It is known in the art that mercapto compounds in aqueous solution may be attached to the nitrile group of cyanamide, whereby S-substituted isothiourea is formed. This addition reaction occurs in a pH range above pH 7 and preferably between pH 7 and 9. It is also known, that a secondary reaction occurs if thiols having free amino groups in a position adjacent the SH-group are attached to the nitrile group of cyanamide. In the course of this reaction, the guanyl group is transferred from the sulfur to the amino group. Thus, for example, cysteine may be attached to cyanamide in order to obtain α-guanidino-β-mercaptopropionic acid.

SUMMARY OF INVENTION

On the basis of this knowledge, the person skilled in the art might attempt to attach cysteine with its SH group to the nitrile group of dicyandiamide and expect a reaction product corresponding or analogous to α-guanidino-β-mercaptopropionic acid. We have discovered, however, that contrary to such expectation the addition reaction is appreciably slower than in the afore-mentioned addition reactions of mercapto compounds, and furthermore that the reaction depends only to a very slight degree on the pH of the aqueous reaction solution. We have discovered that the reaction product of cysteine and dicyandiamide is L- or DL-2-guanidino-1,3-thiazoline carboxylic acid (depending on the type of cysteine used), rather than a reaction product corresponding with or analogous to α-guanidino β-mercaptopropionic acid. During the reaction, ammonia is separated and a ring formation occurs in acidic as well as basic solution yielding a thiazoline carboxylic acid (see formula 1a) or the tautomere thereof, a thiazolidine carboxylic acid (see formula 1b).

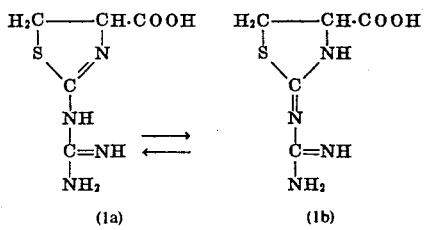

DESCRIPTION OF INVENTION AND PREFERRED EMBODIMENTS

It is thereby possible for the first time, by a simple reaction of cysteine and dicyandiamide to prepare L- and DL-2-guanidino-1,3-thiazoline carboxylic acid-4 (formula 1a) and its tautomer, L- and DL-2-guanidino-1,3thiazolidine carboxylic acid-4 (formula 1b), which are highly useful at least as an intermediary product, as will be presently explained. The reaction occurs in aqueous solution of the reactants readily at room temperature, with or without stirring. While a temperature of about 20° C is preferred, any temperature from the range of 0°–80° C is useful to produce this reaction.

Our novel carboxylic acids form substantially sparingly soluble copper salts with inorganic or organic copper-II-salts. These copper salts may conveniently be prepared by mixing stoechiometric amounts of our carboxylic acid and an inorganic or organic copper-II-salt, but if the acid component is soluble in water, an excess of such acid or the copper salt thereof will be useful and will preferably be added. Useful temperatures for the reaction to produce the sparingly soluble copper salts may be selected from the range of 0°–100° C. The preferred temperature is 60° C.

As distinguished from the comparable 2-aminothiazoline carboxylic acid-4, which also forms a sparingly soluble copper salt and which is symmetrically structured with 2-thiazoline carboxylic acid radicals, the copper salt of the 2-guanidino-1,3-thiazoline carboxylic acid-4 (see formula 2a) and its tautomer (see formula 2b) contain only one thiazoline radical, the other thiazoline radical being replaced by another anion, which is introduced with the inorganic or organic copper-II-salt when preparing the copper salt of this novel carboxylic acid.

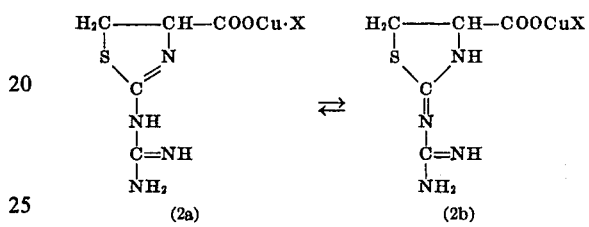

wherein X is a monovalent inorganic or organic anion or half an equivalent of a divalent inorganic or organic anion,such as of organic acids, belonging to the aromatic, aliphatic or heterocyclic series. Acidic salts containing e. g. only a single oxalic acid radical for one thiazoline carboxylic acid radical may also be formed by dibasic organic acids such as, for example, oxalic acid. The basic copper salt of 2-guanidino-1,3-thiazoline carboxylic acid-4 (see formula 3a) or its tautomer (see formula 3b) can be obtained from these copper salts by adding a suitable base former, such as alkali, ammonia or organic bases. These basic copper salts may also change to their corresponding anhydrides (3c and 3d).

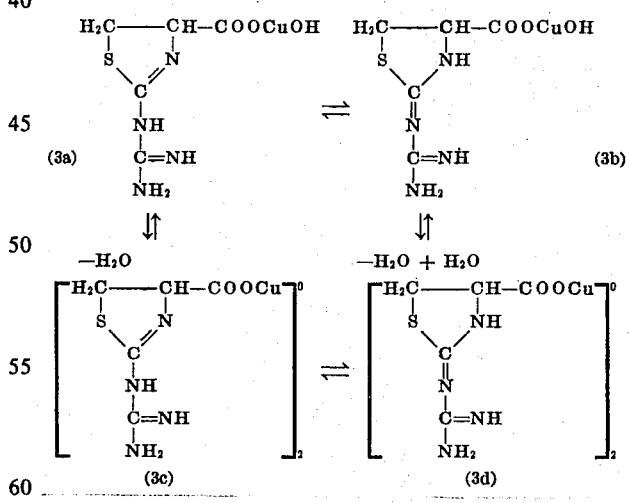

These basic copper salts, as described by formulas 3a and 3b, or their respective anhydrides (formulas 3c and 3d), are capable of forming with inorganic or organic acids salts which are sparingly soluble and which therefore are useful as separating agents, such as by deposition or separation, of a great number of organic or inorganic acids, the particular selection of which is well within the reach of the person skilled in the art by simple experimentation. As mentioned further above, X in these salts can be an acid from the aliphatic, aromatic or heterocyclic series.

A further useful application of the compositions of our invention and their basic copper salts or the anhydrides thereof may be seen in their capability of separating the antipodes of the racemates of optically active acids, thus making possible for the first time a full and clean separation of the antipodes of such acids. Heretofore, separation via diastereomere salts accomplished the separation of but one of the optical antipodes, since the solubility differences diastereomer forms are not large enough to permit of a clean separation of both optical antipodes, and the solution invariably contained the salt of one of the antipodes together with small amounts of the salt of the partially separated other antipodes. We have discovered that contrary to what would be expected on the basis of such experience the diastereomere copper complexes obtained from the basic copper salt of L-2-guanidino-1,3-thiazoline carboxylic acid-4 (3a) or its tautomer (3b), or the respective anhydrides (3c, 3d) provide for a clean and substantially complete separation of the racemate into the optical antipodes.

This use is particularly advantageous for the separation of the optical antipodes of DL-aspartic acid, constituting the preferred embodiment of such use of this invention. The quantitative separation produces, after decomposition of the copper complex, substantially optically pure D-aspartic acid and L-aspartic acid.

The importance of preparing optically pure products is well known to the person skilled in the art, and it may suffice to refer to the importance of optically pure chemical intermediary production in the production of pharmaceuticals for human or veterinarian use.

The invention will be described in further detail by the following examples which in no way are intended to limit the scope and applicability of this invention, beyond the appended claims.

The first three examples illustrate the preparation of L- and DL-2-guanidino-1,3-thiazoline carboxylic acid-4, but it will be understood that the preparation of the tautomer, L- and DL-2-guanidino-1,3-thizolidine carboxylic acid-4 may be effected in an entirely analogous manner.

EXAMPLE I 8.4 grams of dicyandiamide are added to a solution of 12 grams L-cysteine in 100 milliliters of water. The solutions is allowed to stand at room temperature for 6 days, and after such reaction time of 6 days a yield of 7.1 grams = 37.8 percent of the theoretical yield of L-2-guanidino-1,3-thiazoline carboxylic acid-4 is obtained as a precipitate. It will be noted that the product has become basic during this 6 day period.

$C_5H_8N_4O_2S$ Mol Wt. 188,21
calculated: N 29.77    S 17.03
found: N 28.95    S 16.30    Melt. Pt. Degrad. above 200° C (not characteristic)

EXAMPLE II

One hundred grams of dicyandiamide are added to a solution of 175.5 grams L-cysteine-hydrochloride-monohydrate in 1 liter of water. The solution is stirred for 40 hours at room temperature, and a deposit of 158.6 grams = 84.5 percent of the theoretical yield of L-2-guanidino-1,3-thiazoline carboxylic acid-4 are obtained.

Calculated: N 29,77    S 17,03
found: N 29.1    S 16.43
optical rotation ($\alpha$) $_D 25 - 60.6°$
($c = 8$; 1n-HC)
melt. pt. degrad. above 220° C.
(not characteristic).

EXAMPLE III 30 grams dicyandiamide are added to a solution of 57 grams DL-cysteine-hydrochloride-monohydrate in 320 milliliters of water. The solution is stirred for 40 hours at room temperature, and the deposited yield is 47.5 grams = 78 percent of theoretical.

Calculated N 29.77    S17.03

Found: N 29.0    S 16.35

The following Examples IV– VII illustrate the preparation of a complex copper salt, such as a chloride or acetate complex of L- and DL-2-guanidino-1,3-thiazoline carboxylic acid-4, and it will again be understood that the preparation of the corresponding complex of the tautomer may proceed in an entirely analogous manner.

EXAMPLE IV 7.6 grams of L-2-guanidino-1,3-thiazoline carboxylic acid-4 are suspended in 400 milliliters of water and 7.5 grams of copper-II-chloride crystals are added to the suspension under constant stirring. A deep, intense, blue color (cornflower blue) develops immediately and the complex chloride is precipitated from the solution after a very short period of time. After several hours of stirring a yield of 11.4 grams = 94 percent of theoretical are obtained.

$C_5H_7N_4O_2SCuCl \cdot H_2O$    Mol. Wt. 304.24
Calculated: Cu 20.89    Cl 11.65 $H_2O$ 5.92
Found: Cu 20.60    Cl 11.70 $H_2O$ 5.78

EXAMPLE V

Example IV is repeated, except that the starting material is 7.6 grams DL-2-guanidino-1,3-thiazoline carboxylic acid-4. The yield is 11.4 grams = 94 percent of theoretical.

$C_5H_7N_4O_2SCuCl \cdot H_2O$    Mol. Wt. 304.24
Calculated: Cu 20.89    Cl 11.65 $H_2O$ 5.92
Found: Cu 20.75    Cl 11.80 $H_2O$ 5.85

EXAMPLE VI

A solution of 5 grams copper-II-acetate crystals in 100 milliliters of water is added drop by drop to a suspension of 3,8 grams L-2-guanidino-1,3-thiazoline carboxylic acid-4 in 100 milliliters of water. The L-2-guanidino-1,3-thiazoline carboxylic acid-4 is converted to the copper acetate, which is also sparingly soluble. After several hours of continuous stirring the solution is drained. The yield is 4 grams = 61 percent of theoretical.

$C_7H_{10}N_4O_4SCu \cdot H_2O$    Mol. Wt. 327.83
Calculated: Cu 19.39    N 17.09 S 9.78 $H_2O$ 5.50
Found: Cu 19.01    N 17.02 S 9.89 $H_2O$ 5.12

EXAMPLE VII 5 grams of copper-II-acetate salt crystals are added to a suspension of 3.8 grams DL-2-guanidino-1,3-thiazoline carboxylic acid-4 in 200 milliliters of water. The DL-2-guanidino-1,3-thiazoline carboxylic acid-4 dissolves and simultaneously therewith deposition of the complex acetate sets in. After 7 hours of stirring a yield of 5.5 grams = 75 percent of the theoretical yield are obtained.

$C_7H_{10}N_4O_4 SCu \cdot 3H_2O$    Mol. Wt. 363.86
Calculated: Cu 17.47    $H_2O$ 14.85
Found: Cu 17.23    $H_2O$ 15,35

The next following two examples illustrate preparation of the basic copper salt.

EXAMPLE VIII

Ninety-four grams of L-2-guanidino-1,3-thizoline carboxylic acid-4 are dissolved in 1 liter of water and an addition of 125 milliliters of 8n—NaOH. This solution is rapidly poured into a solution of 80 grams of crystalline copper-II-chloride in 500 milliliters of water having a temperature of 80° C. The solution has a deep blue color and soon a precipitate of dark blue crystals of the basic copper salt of L-2-guanidino-1,3-thiazoline carboxylic acid-4 is formed. After 4 hours of continued stirring and cooling a yield of 117.4 grams = 87.5 percent of theoretical are obtained.

$C_5H_7N_4O_2SCuOH$    Mol. Wt. 267.78

Calculated: Cu 23.73 equivalent weight 267.8
Found: Cu 23.95 equivalent weight 268.0

EXAMPLE IX

2n—NaOH is added to a suspension of 3 grams of copper-propionate complex in 80 milliliters of water, until a pH of 10 is obtained. The solution is continuously stirred during the night and in the morning the dark blue basic copper salt is found. The yield is 1.5 grams = 70 percent of the theoretical yield.

Calculated: Cu 23.74
Found: Cu 25.0

The following four examples illustrate the use of the basic copper salt as a precipitating agent for a variety of organic or inorganic acids.

EXAMPLE X 2.7 grams of the basic copper salt are prepared according to Example VIII and are suspended in 300 milliliters of water. The suspension is heated to a temperature of 60° C and while being held at this temperature 6 milliliters of 2n-hydrochloric acid are added. The basic copper salt is dissolved and shortly thereafter the chloride complex is precipitated, having a brilliant, blue color. After cooling the yield is 2.2 grams = 72.5 percent of theoretical. The yield may be increased to over 90 percent by adding about 1 gram of common salt (sodium chloride).

$C_5H_7N_4O_2SCuCl \cdot H_2O$    Mol. Wt. 304.24
Calculated    Cu 20.89    Cl 11.65
Found:    Cu 20.80    Cl 11.86

EXAMPLE XI 2.7 grams of basic copper salt prepared according to Example VIII are suspended in 150 milliliters of water. The suspension is heated to a temperature of about 60° C and while at this temperature there are added 6 milliliters of 2n-acetic acid and 1 gram of sodium acetate. After cooling the acetate yield is 1.6 grams = 49 percent of theoretical.

$C_7H_{10}N_4O_4SCu \cdot H_2O$    Mol. Wt. 327.83
Calculated:    Cu 19.39
Found:    Cu 19.47

EXAMPLE XII 2.7 grams basic copper salt are added to a solution of 1.7 gram benzoic acid in 200 milliliters of water having a temperature of 55° C. After cooling, the benzoate yield is 3.75 grams = 96.5 percent of theoretical.

$C_{12}H_{12}N_4O_4SCu \cdot H_2O$    Mol. Wt. 389.90
Calculated:    Cu 16.30    $H_2O$ 4.62
Found:    Cu 16.27    $H_2O$ 4.27

EXAMPLE XIII

A suspension of 2.7 grams basic copper salt in 300 milliliters of water is heated to a temperature of 60° C and while being held at this temperature a solution of 2.5 grams 5-nitrodorotic acid in 30 milliliters of water is added. The basic copper salt dissolves in a few seconds, and subsequently the nitroorotate complex is precipitated, having a brilliant, turquoise color. After cooling, the yield is 4.4 grams = 97.5 percent of the theoretical yield.

$C_{10}H_9N_7O_8SCu$    Mol. Wt. 450.86
Calculated: Cu 14.10
Found: Cu 13.80

According to a further, preferred use of this invention, the basic copper salt, prepared for example as set forth in Example VIII, may be used in order to achieve a clean separation of the optical antipodes of the racemates of optically active acids, such as, for instance, aspartic acid.

EXAMPLE XIV

A solution of 32 grams (0.24 mole) DL-aspartic acid in 4 liters of water is heated to a temperature of 50° C. At this temperature, there are added 53.6 grams (0.2 mole) of basic copper salt prepared as set forth in the preceding Example VIII. After cooling, a precipitate is formed consisting of 51.4 grams (0.12 mole) of the complex salt of L-aspartic acid.

$C_{18}H_{26}N_{10}O_{12}S_2Cu_2 \cdot 5 H_2O$    Mol. Wt. 855.81
Calculated: Cu 14.86
Found: Cu 14.72

After decomposition of the afore-mentioned complex salt, the yield of L-aspartic acid is 7.8 grams = 49 percent of theoretical.

Optical rotation: Literature
    $(\alpha) D^{25} = +24.6°$ $(c = 2; 6n\text{-HCl})$
Optical rotation: found:
    $(\alpha) D^{25} = +24.8°$ $(c = 2; 6n\text{-HCl})$ The initial solution of the complex salt of the L-aspartic acid is then evaporated under vacuum to one-fourth of its original volume and filtered. The filtrate contains 27.7 grams of the complex copper salt of the D-aspartic acid.

$C_{18}H_{26}N_{10}O_{12}S_2Cu_2 \cdot 7 H_2O$    Mol. Wt. 891.84
Calculated: Cu 14.26    $H_2O$ 14.14
Found: Cu 14.09    $H_2O$ 13.52

After decomposition of the afore-mentioned complex salt, 4.4 grams of D-aspartic acid are obtained.

Optical rotation: $(\alpha) D^{25} = -24.8°$
    $(c = 2; 6n\text{-HCl})$

The following two Examples XV and XVI illustrate preparation of the anhydride of the basic copper salt of 2-guanidino-L-thiazoline carboxylic acid.

EXAMPLE XV 15.2 grams of the chloride complex prepared by Example IV were suspended in 250 cm³ of water at room temperature. After adding 6.3 grams of sodiumbicarbonate the suspension was agitated for 24 hours, during which period the anhydride of the basic copper salt of 2-guanidino-L-thiazoline carboxylic acid was formed and separated by filtration. The yield of $C_{10}H_{14}N_8O_5S_2Cu_2$ was 12.1 grams = 93.4% of theoretical.

Calculated: equivalent weight 253; 25.0% copper and 12.81% sulfur;
found: equivalent weight 258.8; 24.5% copper and 12.39% sulfur.

EXAMPLE XVI 3.05 grams of the chloride complex prepared by Example V were partially dissolved in 300 cm³ of water at a temperature of 60° C. After adding 1.5 grams of Na-benzoate the solution was stirred for one hour at 60° C and drained. The obtained yield was 3.3 grams (85%) of the complex benzoate $C_{12}H_{12}N_4O_4SCu \cdot H_2O$, molecular weight 389.90.

Calculated: 16.30% copper, 8.22% sulfur, and 4.62% water.
Found: 16.2% copper, 8.38% sulfur, and 4.27% water.
The chloride reaction was negative.

What we claim is:
1. As a composition of matter, copper-II-salts of 2-guanidino-1,3-thiazolinecarboxylic acid-4 having the formula

$$\begin{array}{c} H_2C\text{———}CH\text{—}COOCuX \\ | \qquad\qquad | \\ S \qquad\qquad N \\ \diagdown \quad \diagup \\ C \\ | \\ NH \\ | \\ C=NH \\ | \\ NH_2 \end{array} \qquad (I)$$

wherein X is an anion selected from the group consisting of OH, Cl, acetate, propionate, oxalate, benzoate, and nitroorotate.

2. Basic copper-II-salts of the composition of claim 1 wherein X is OH.

3. Basic copper-II-salts of the composition of claim 1, wherein the 2-guanidino-1,3-thiazolinecarboxylic acid-4 has the L-form.

4. Basic copper-II-salts of the composition of claim 1, wherein the 2-guanidino-1,3-thiazolinecarboxylic acid-4 has the DL-form.

* * * * *